D. C. STOVER.
Wire Fences.
No. 164,947. Patented June 29, 1875.
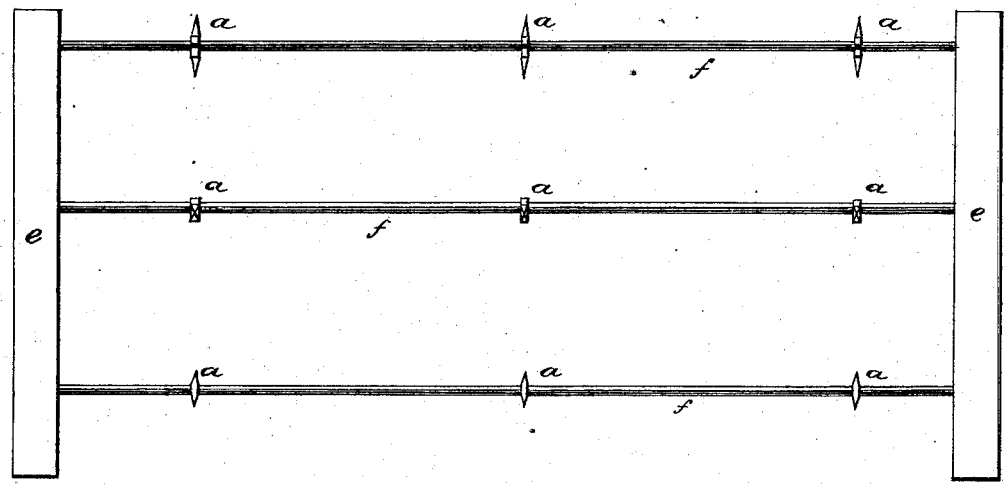
Fig. 1.
Fig. 2.  Fig. 3.  Fig. 4.  Fig. 5.  Fig. 6.
WITNESSES:
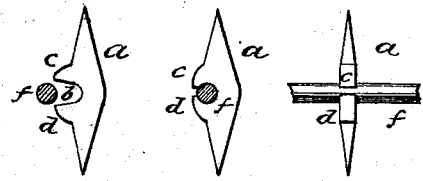
INVENTOR
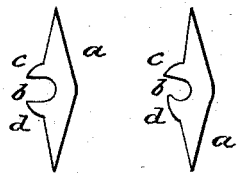
THE GRAPHIC CO. PHOTO-LITH. 39 & 41 PARK PLACE, N.Y.

UNITED STATES PATENT OFFICE.

DANIEL C. STOVER, OF FREEPORT, ILLINOIS.

IMPROVEMENT IN WIRE-FENCES.

Specification forming part of Letters Patent No. 164,947, dated June 29, 1875; application filed May 22, 1875.

*To all whom it may concern:*

Be it known that I, DANIEL C. STOVER, of Freeport, in the county of Stephenson and State of Illinois, have invented new and useful Improvements in Wire-Fences, of which the following is a full description, reference being had to the accompanying drawings, in which—

Figure 1 is an elevation; Figs. 2, 3, and 4, details, full size; Figs. 5 and 6, modifications, full size.

My invention consists in a peculiarly-constructed barb, which may be secured to the wire, either before or after the same is in place, and in an improved mode of securing the barb in place.

In the drawing, *a* represents a single barb. It can most conveniently be made by cutting it with dies, in substantially the same way that nails are cut, from metal of suitable quality and thickness. Upon one side is an opening, *b*, and two projecting points, *c d*, so formed that one or both can be hammered down upon the wire *f* of the fence.

Fig. 5 represents a similar barb slightly varied in form. Fig. 6 is another variation, the only difference being in the form of the points at the opening for the wire. I prefer the form shown in Fig. 6.

This barb can be made at small expense compared with any which are now in use, and can be applied to the wire by a single blow upon the point *c*, which will bring it so closely in contact with the wire that the barb will not revolve thereon or move laterally. This mode of applying the barb will be used after the fence-wires *f* are up, or they may be so applied to the wires before they are secured to the posts *e*.

I have discovered that an efficient way to secure these barbs to the longitudinal wires at the manufactory is to pass the wire through a furnace, and apply the barbs thereto while hot. When so done, the wire itself will be slightly flattened at the points where the barbs are attached, which will aid in keeping them in position.

I am aware that barbs for wire-fences have been made having an opening on the side to permit the same to be placed upon the wire; and I do not claim, broadly, such a barb having an opening; but What I do claim, and desire to secure by Letters Patent, is as follows:

1. The barb *a*, for a wire-fence, having an opening, *b*, upon one side, and projecting points *c d* upon each side of such opening, so formed that the barb can be secured to the wire by hammering or pressing one or both points upon the wire, substantially as specified.

2. The process herein described of securing the barbs to the wire by first heating the wires and applying the barbs thereto while the wire is hot, substantially as and for the purposes specified.

DANIEL C. STOVER.

Witnesses:
HENRY M. BARNUM,
EDWARD P. BARTON.